United States Patent
Yu et al.

(10) Patent No.: US 12,541,936 B2
(45) Date of Patent: Feb. 3, 2026

(54) METHOD AND APPARATUS FOR DETECTING NEAR-FIELD OBJECT, AND MEDIUM AND ELECTRONIC DEVICE

(71) Applicant: Beijing Roborock Innovation Technology Co., Ltd., Beijing (CN)

(72) Inventors: Yang Yu, Beijing (CN); Zhen Wu, Beijing (CN)

(73) Assignee: BEIJING ROBOROCK INNOVATION TECHNOLOGY CO., LTD., Beijing (CN)

(*) Notice: Subject to any disclaimer, the term of this patent is extended or adjusted under 35 U.S.C. 154(b) by 175 days.

(21) Appl. No.: 18/259,411

(22) PCT Filed: Jun. 17, 2021

(86) PCT No.: PCT/CN2021/100720
§ 371 (c)(1),
(2) Date: Jun. 27, 2023

(87) PCT Pub. No.: WO2022/142172
PCT Pub. Date: Jul. 7, 2022

(65) Prior Publication Data
US 2024/0071023 A1 Feb. 29, 2024

(30) Foreign Application Priority Data
Dec. 30, 2020 (CN) .......................... 202011619047.8

(51) Int. Cl.
*G06V 10/141* (2022.01)
*G06T 5/50* (2006.01)
(Continued)

(52) U.S. Cl.
CPC .............. *G06V 10/141* (2022.01); *G06T 5/50* (2013.01); *G06T 7/11* (2017.01); *G06T 7/194* (2017.01);
(Continued)

(58) Field of Classification Search
CPC ............................ G06V 10/141; G05D 1/622
See application file for complete search history.

(56) References Cited

U.S. PATENT DOCUMENTS 9,189,706 B1 * 11/2015 Lee ........................ G06V 40/28
9,654,738 B1   5/2017 Ferguson
(Continued)

FOREIGN PATENT DOCUMENTS

| CN | 103440484 A | 12/2013 |
|---|---|---|
| CN | 103854009 A | 6/2014 |

(Continued)

OTHER PUBLICATIONS

CN-107493415-A; Qian, Yue-zhen; Anti-backlight Photographing System; Dec. 19, 2017; English Translation; pp. 1-4 (Year: 2017).*

(Continued)

*Primary Examiner* — Cynthia Segura
(74) *Attorney, Agent, or Firm* — Calfee, Halter & Griswold LLP (57) ABSTRACT

Disclosed are a method and apparatus for detecting a near-field object, a medium and an electronic device. In the present disclosure, the characteristics of an automatic exposure apparatus before and after light supplement of a light supplement lamp are used, two images are shot in the same direction before and after light supplement of the light supplement lamp, and whether the near-field object exists is determined through comparison of the two images. Without adding additional apparatuses, the task of discovering the near-field objects by a self-walking device is completed by using the existing apparatus, and the collision between the self-walking device and the near-field object is avoided.

17 Claims, 3 Drawing Sheets

(51) Int. Cl.
*G06T 7/11* (2017.01)
*G06T 7/194* (2017.01)
*G06V 10/60* (2022.01)
*H04N 23/74* (2023.01)

(52) U.S. Cl.
CPC ............. *G06V 10/60* (2022.01); *H04N 23/74* (2023.01); *G06T 2207/20224* (2013.01); *G06V 2201/07* (2022.01)

(56) References Cited

U.S. PATENT DOCUMENTS

| | | | |
|---|---|---|---|
| 10,504,240 B1* | 12/2019 | Solh | G06T 7/80 |
| 2011/0013032 A1* | 1/2011 | Hatanaka | H04N 23/66 |
| | | | 348/E5.042 |
| 2011/0102664 A1 | 5/2011 | Chuang | |
| 2014/0125815 A1* | 5/2014 | Holz | H04N 23/81 |
| | | | 348/169 |
| 2015/0160341 A1 | 6/2015 | Akatsu | |
| 2015/0358556 A1 | 12/2015 | Karem | |
| 2023/0347502 A1* | 11/2023 | Wang | G06T 7/70 |

FOREIGN PATENT DOCUMENTS

| | | |
|---|---|---|
| CN | 104463253 A | 3/2015 |
| CN | 105830428 A | 8/2016 |
| CN | 106097317 A | 11/2016 |
| CN | 106651801 A | 5/2017 |
| CN | 107456172 A | 12/2017 |
| CN | 107493415 A * | 12/2017 ........... H04N 5/2254 |
| CN | 108802742 A | 11/2018 |
| CN | 107493415 B | 2/2020 |
| CN | 110824498 A | 2/2020 |
| CN | 210377502 U | 4/2020 |
| CN | 111121722 A | 5/2020 |
| CN | 111310575 A | 6/2020 |
| CN | 112804447 A | 5/2021 |
| EP | 2306366 A1 | 4/2011 |

OTHER PUBLICATIONS

International Search Report from PCT/CN2021/100720 dated Sep. 28, 2021.
Office action from Chinese Application No. 202011619047.8 dated Jun. 20, 2022.
Office action from Chinese Application No. 202011619047.8 dated Jan. 4, 2022.
Miao et al. "Study on Power Transmission Lines Inspection Using Unmanned Aerial Vehicle and Image Recognition of Insulator Defect", Journal of Electronic Measurement and Instrumentation, vol. 29, No. 12, 8 pgs., Dec. 2015.
Extended European Search Report of application No. 21912930.1 dated Oct. 28, 2024.

* cited by examiner

METHOD AND APPARATUS FOR DETECTING NEAR-FIELD OBJECT, AND MEDIUM AND ELECTRONIC DEVICE

CROSS-REFERENCE TO RELATED APPLICATION

This application is a 35 U.S.C. 371 national phase application of the PCT International Application No. PCT/CN2021/100720 filed on Jun. 17, 2021, which PCT International Application claims priority of the Chinese Patent Application No. 202011619047.8, filed on Dec. 30, 2020, both of which are incorporated herein by reference in their entireties.

TECHNICAL FIELD

The present disclosure relates to the field of robot technologies, and in particular to a method and apparatus for detecting a near-field object, a medium and an electronic device.

BACKGROUND

The field of view (FOV for short) of a camera determines a field of view range of the camera. An optical axis of the camera is a center line passing through the center point of a camera lens, and a change in the direction of the optical axis means rotation or turning of the camera.

Self-walking devices often use front cameras to collect obstacle information. Therefore, the obstacle information obtained by the front cameras will affect a walking mode of the self-walking devices.

SUMMARY

The section of summary is provided to briefly introduce the concepts that are described in detail in the following section of detailed description. This section of summary is neither intended to identify key features or essential features of the claimed technical solutions, nor intended to limit the scope of the claimed technical solutions.

According to specific embodiments of the present disclosure, in a first aspect, the present disclosure provides a method for detecting a near-field object, including:
 collecting a first image before light supplement of a light supplement lamp, and a second image when the light supplement lamp is activated for light supplement;
 generating, based on the first image and the second image, a third image including a regional bright spot; and
 determining, based on a connected domain of the regional bright spot in the third image, whether the near-field object exists.

Optionally, generating, based on the first image and the second image, the third image including the regional bright spot, includes:
 generating, based on a mean value of pixel values in the first image, a first background image;
 generating, based on the second image and the first background image, a first difference image; and
 binarizing, based on a preset binarization threshold, the first difference image to generate the third image.

Optionally, generating, based on the first image and the second image, the third image including the regional bright spot, includes:
 obtaining a first region image from the first image;
 generating, based on a mean value of pixel values in the first region image, a second background image;
 obtaining, based on the preset region of interest, a second region image corresponding to the first region image from the second image;
 generating, based on the second region image and the second background image, a second difference image; and
 binarizing, based on a preset binarization threshold, the second difference image to generate the third image.

Optionally, generating, based on the mean value of the pixel values in the first region image, the second background image, includes:
 dividing the first region image into a plurality of first region blocks; and
 respectively calculating a mean value of pixel values in each first region block to generate the second background image, where the second background image includes a plurality of background region blocks corresponding to the plurality of first region blocks.

Optionally, generating, based on the second region image and the second background image, the second difference image, includes:
 dividing, based on the background region blocks, the second region image into a plurality of second region blocks corresponding to the background region blocks; and
 generating, based on the second region blocks and the corresponding background region blocks respectively, the second difference image.

Optionally, determining, based on the connected domain of the regional bright spot in the third image, whether the near-field object exists, includes:
 obtaining a region size value of the connected domain of the regional bright spot in the third image; and
 determining, when the region size value is greater than or equal to a preset region size threshold, that the near-field object exists.

Optionally, collecting the first image before light supplement of the light supplement lamp, and the second image when the light supplement lamp is activated for light supplement, includes:
 collecting the second image when the light supplement lamp is activated for light supplement and a light supplement parameter value is adjusted.

Optionally, the method further includes: rotation or turning, and after or in a process of rotation or turning, collecting the first image before light supplement of the light supplement lamp, and the second image when the light supplement lamp is activated for light supplement.

According to specific embodiments of the present disclosure, in a second aspect, the present disclosure provides an apparatus for detecting a near-field object, including:
 a collection unit, configured to collect a first image before light supplement of a light supplement lamp, and a second image when the light supplement lamp is activated for light supplement;
 a processing unit, configured to generate, based on the first image and the second image, a third image including a regional bright spot; and
 an analysis unit, configured to determine, based on a connected domain of the regional bright spot in the third image, whether the near-field object exists.

Optionally, the processing unit is configured to:
 generate, based on a mean value of pixel values in the first image, a first background image;

generate, based on the second image and the first background image, a first difference image; and binarize, based on a preset binarization threshold, the first difference image to generate the third image.

Optionally, the processing unit is configured to:

obtain a first region image from the first image;

generate, based on a mean value of pixel values in the first region image, a second background image;

obtain, from the second image, a second region image corresponding to the first region image;

generate, based on the second region image and the second background image, a second difference image; and binarize, based on a preset binarization threshold, the second difference image to generate the third image.

Optionally, generating, based on the mean value of the pixel values in the first region image, the second background image, includes:

dividing the first region image into a plurality of first region blocks; and respectively calculating a mean value of pixel values in each first region block to generate the second background image, where the second background image includes a plurality of background region blocks corresponding to the plurality of first region blocks.

Optionally, generating, based on the second region image and the second background image, the second difference image, includes:

dividing, based on the background region blocks, the second region image into a plurality of second region blocks corresponding to the background region blocks; and generating, based on the second region blocks and the corresponding background region blocks respectively, the second difference image.

Optionally, the analysis unit is configured to:

obtain a region size value of the connected domain of the regional bright spot in the third image; and determine, when the region size value is greater than or equal to a preset region size threshold, that the near-field object exists.

Optionally, the collection unit is configured to:

collect the second image when the light supplement lamp is activated for light supplement and a light supplement parameter value is adjusted.

Optionally, the collection unit is further configured to:

after or in a process of rotation or turning, collect the first image before light supplement of the light supplement lamp, and the second image when the light supplement lamp is activated for light supplement.

According to specific embodiments of the present disclosure, in a third aspect, the present disclosure provides a computer-readable storage medium, with a computer program stored thereon, where the program, when executed by a processor, implements the method for detecting a near-field object according to the first aspect.

According to specific embodiments of the present disclosure, in a fourth aspect, the present disclosure provides an electronic device including: one or more processors; and a storage apparatus for storing one or more programs, where the one or more programs, when executed by the one or more processors, enable the one or more processors to implement the method for detecting a near-field object according to the first aspect.

BRIEF DESCRIPTION OF THE DRAWINGS

The above and other features, advantages and aspects of various embodiments of the present disclosure will become more apparent in conjunction with the accompanying drawings and with reference to the following detailed embodiments. Throughout the drawings, the same or similar reference signs refer to the same or similar elements. It should be understood that the drawings are schematic and that components and elements are not necessarily drawn to scale. In the drawings.

DETAILED DESCRIPTION

Embodiments of the present disclosure will be described in more detail below with reference to the accompanying drawings. Although certain embodiments of the present disclosure are shown in the drawings, it should be understood that the present disclosure may be embodied in various forms and should not be construed as limited to the embodiments set forth herein. Instead, these embodiments are provided for the purpose of a more thorough and complete understanding of the present disclosure. It should be understood that the drawings and embodiments of the present disclosure are only for exemplary purposes, and are not intended to limit the protection scope of the present disclosure.

It should be understood that various steps described in the method embodiments of the present disclosure may be executed in different orders and/or in parallel. Furthermore, the method embodiments may include additional steps and/or the execution of some illustrated steps may be omitted. The scope of the present disclosure is not limited in this regard.

As used herein, the term "includes" and variations thereof are open-ended inclusions, i.e., "includes but is not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the descriptions below.

It should be noted that concepts such as "first" and "second" mentioned in the present disclosure are only used to distinguish different apparatuses, modules or units, and are not used to limit the order or interdependence of functions executed by these apparatuses, modules or units.

It should be noted that the modifications of "one" and "a plurality of" mentioned in the present disclosure are illustrative rather than restrictive, and those skilled in the art should understand that unless it is clearly indicated otherwise in the context, they should be understood as "one or a plurality of".

The names of messages or information exchanged between multiple apparatuses in embodiments of the present disclosure are only for illustrative purposes, and are not intended to limit the scope of these messages or information.

Figure 1:
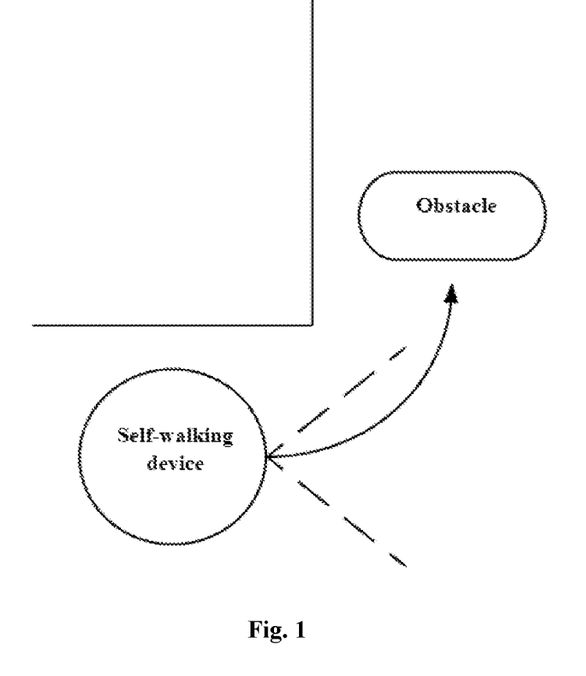
FIG. 1 shows a schematic diagram of a self-walking device in front of a corner and an obstacle.
Figure 2:
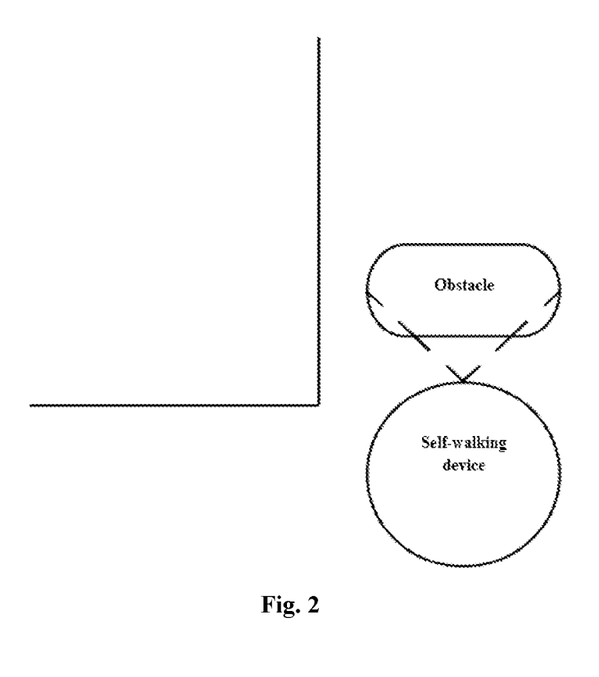
FIG. 2 shows a schematic diagram of the self-walking device in a short distance from the obstacle after passing the corner.

For example, as shown in when a self-walking device moves at one side of a corner, a front camera cannot find an obstacle behind the corner within the field of view angle shown by the dotted line, due to the blocking of the obstacle by the corner. As shown in FIG. 2, after the self-walking device passes the corner after turning, the self-walking device cannot recognize the obstacle since a distance between the obstacle and the self-walking device is too close.

Optional embodiments of the present disclosure will be described in detail below in combination with the accompanying drawings.

According to a first aspect of the present disclosure, there is provided a method for detecting a near-field object.

Embodiments of the method for detecting a near-field object according to the first aspect of the present disclosure will be described in detail below in combination with the accompanying drawings.

Embodiment 1

Figure 3:
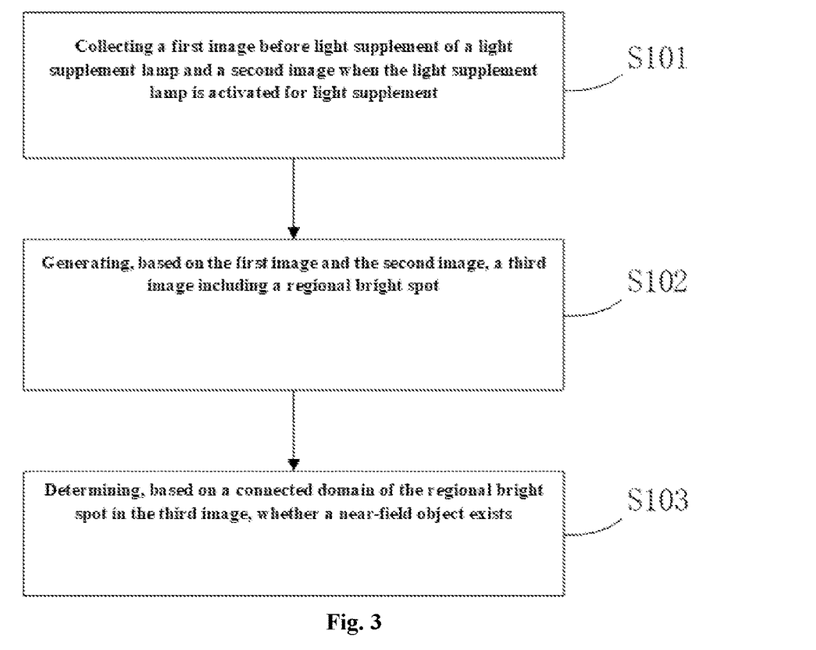
FIG. 3 shows a flowchart of a method for detecting a near-field object according to an embodiment of the present disclosure.

As shown in FIG. 3, in step S101, a first image before light supplement of a light supplement lamp and a second image when the light supplement lamp is activated for light supplement are collected.

Figure 4:
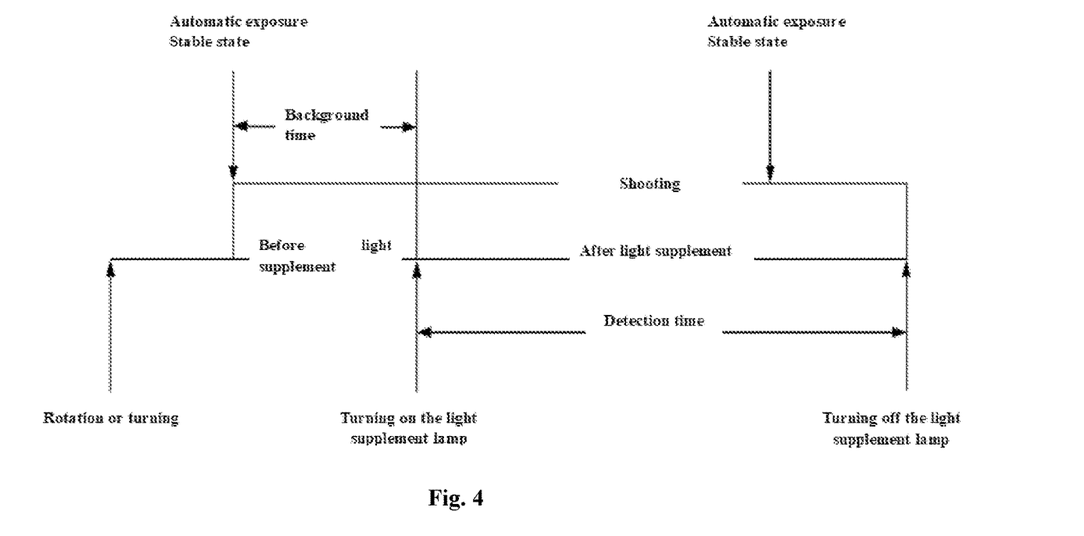
FIG. 4 shows a schematic diagram of a detection logic for the near-field object based on a light supplement lamp.

The self-walking device generally uses the front camera to collect obstacle information. As shown in FIG. 4, in a normal lighting scene, before the light supplement, an automatic exposure apparatus (AE for short) of the light supplement lamp is in a stable state (AE stable for short). When the light supplement lamp is turned on, the AE of the light supplement lamp is in an overexposure state at first, and is then gradually transitioned to the stable state after adjustment for a period of time. After the stable state lasts for a period of time, the light supplement lamp is turned off. Before the light supplement, a period starting from the time when the AE of the light supplement lamp enters the stable state to the time when the light supplement lamp is turned on is called background time, and a period starting from the time when the light supplement lamp is turned on to the time when the light supplement lamp is turned off is called detection time.

Under normal lighting, if the near-field object exists in front of the camera, an image of the near-field object can be shot in the background time. In the detection time, the image of the near-field object shot when the AE of the light supplement lamp is in the overexposure state is prone to generate an overexposure phenomenon. After the AE of the light supplement lamp becomes stable, a clear image of the near-field object with higher brightness can be shot. Embodiments of the present disclosure utilize characteristics of the light supplement lamp before and after the light supplement.

In order to ensure the stability in shooting, an embodiment of the present disclosure selects to collect the images after the self-walking device is paused after rotation or turning. In the same direction, that is, when the direction of an optical axis of the camera remains unchanged, the first image is collected before light supplement of the light supplement lamp (that is, the light supplement lamp is in the background time), and the second image is collected when the light supplement lamp is activated (that is, the light supplement lamp is in the detection time and the AE is in the overexposure state). If the near-field object exists in front of the camera, the first image is an image of the near-field object under normal lighting, and the second image is an image of the near-field object under the light supplement. The image after the light supplement includes a regional bright spot. The regional bright spot is caused by the fact that since the brightness of a local area in the image exceeds a normal range, an actual color or pattern of the local area in the image cannot be distinguished.

Optionally, an embodiment of the present disclosure selects to collect the images in the process of rotation or turning, so that the near-field object can be quickly found, and the speed of recognition can be improved.

Optionally, collecting the second image when the light supplement lamp is activated for light supplement includes the following steps.

In step S101, when the light supplement lamp is activated for light supplement and a light supplement parameter value is adjusted, the second image is collected.

When the light supplement lamp is activated for light supplement and the light supplement parameter value is adjusted, it can be understood that the AE of the light supplement lamp is in the overexposure state. In this case, an overexposed image of the near-field object can be acquired. The second image is collected by the light supplement lamp in the overexposure state of AE, and strong light causes the near-field object to produce strong light reflection. Therefore, a more obvious regional bright spot with a larger area is generated in the second image. The near-field object can be analyzed more easily.

In step S102, image processing is performed based on the first image and the second image to generate a third image including the regional bright spot.

By performing image processing on the first image and the second image, the third image including the regional bright spot is extracted therefrom.

In step S103, a connected domain of the regional bright spot in the third image is analyzed, and it is determined whether the near-field object exists.

On the image, the regional bright spot is usually composed of the same or similar pixel values. Therefore, the region has connectivity in the same or similar pixel values. An embodiment of the present disclosure determines whether the near-field object exists based on the connectivity.

Specifically, analyzing the connected domain of the regional bright spot in the third image to determine whether the near-field object exists includes the following steps.

In step S103-1, based on a preset pixel threshold, a region size value of the connected domain of the regional bright spot in the third image is obtained.

The same or similar pixel values are considered to be within the range of a statistical bright spot region through the preset pixel threshold. The region size value is also a value of the connected domain composed of the same or similar pixel values. This value may be represented by the number of pixels in the regional bright spot, or by a percentage of the number of pixels in the regional bright spot to the number of pixels in the third image.

In step S103-2, when the region size value is greater than or equal to a preset region size threshold, it is determined that the near-field object exists.

However, in the normal lighting scene, many objects may have bright spots. That is, the object with a bright spot is not necessarily a near-field object. In an embodiment of the present disclosure, whether the region size value is greater than or equal to the preset region size threshold is used as the basis for determining whether the near-field object exists. That is, if the near-field object exists, the near-field object in the image shot by the AE of the light supplement lamp in the overexposure state must have a phenomena of large-area overexposure, and then the region size value must be greater than or equal to the preset region size threshold. If the region size value is less than the preset region size threshold, it indicates that no near-field object exists.

In an embodiment of the present disclosure, the characteristics of the automatic exposure apparatus before and after the light supplement of the light supplement lamp are used. Before and after the light supplement of the light supplement lamp, two images are shot in the same direction, and it is determined whether the near-field object exists by comparing the two images. Without adding additional apparatuses, the task of discovering the near-field object by the self-walking device is completed by using the existing apparatus, and the collision between the self-walking device and the near-field object is avoided.

Embodiment 2

Since an embodiment of the present disclosure is further optimized based on the above Embodiment 1, the explanations based on the same method and the same names and meanings are the same as those of the above embodiment, and are not repeated here.

Performing image processing based on the first image and the second image to generate the third image including the regional bright spot in Embodiment 1 includes the following steps.

In step S102-11, mean value calculation is performed based on pixel values in the first image to generate a first background image.

The mean value calculation may be understood as calculating a mean value of the sum of all pixel values in the first image. Each pixel value for generating the first background image is the mean value. A color of the first background image is a single-color image.

In step S102-12, difference value calculation is performed based on the second image and the first background image to generate a first difference image.

Here, the difference value calculation may be understood as calculating a difference value between the pixel value at each position in the second image and the pixel value at the corresponding position in the first background image.

In step S102-13, binarization processing is performed based on a preset binarization threshold and the first difference image to generate the third image.

The binarization processing may be understood as setting gray values of the pixels in the image to be 0 or 255, that is, a process for presenting the entire image with an obvious black and white effect.

In an embodiment of the present disclosure, further image processing is performed on the first image and the second image, so that the third image including the regional bright spot is simpler and easier to process.

Embodiment 3

Since an embodiment of the present disclosure is further optimized based on the above Embodiment 1, the explanations based on the same method and the same names and meanings are the same as those of the above embodiment, and are not repeated here.

For step S102-1 in Embodiment 2, performing image processing based on the first image and the second image to generate the third image including the regional bright spot includes the following steps.

In step S102-21, a first region image is acquired from the first image based on a preset region of interest.

In machine vision and image processing, the region that needs to be processed in the image is outlined in the form of closed lines (such as rectangular lines, circular lines, elliptical lines or irregular polygon lines) in the processed image, and is called the region of interest (ROI for short). Various operators and functions are commonly used in the machine vision software to obtain the ROI and perform image processing. In an embodiment of the present disclosure, the region within preset rectangular lines in the middle of the image may be used as the preset ROI, and the first region image may be obtained from the preset ROI. The purpose is to reduce the influence on image analysis of ground reflection after the light supplement.

In step S102-22, mean value calculation is performed based on pixel values in the first region image to generate a second background image.

In a specific application, the following steps are specifically included.

In step S102-22-1, the first region image is divided into a plurality of first region blocks based on a preset block size.

It may be understood that the first region image is divided into the plurality of first region blocks. The first region image may be conveniently divided into a plurality of low-resolution first region blocks by means of window shifting, to reduce calculation complexity. The preset block size is usually set to be 8×8 pixels.

In step S102-22-2, mean value calculation is performed on pixel values in each first region block to generate the second background image.

The second background image includes background region blocks at the same positions as the first region blocks.

In step S102-23, a second region image is acquired from the second image based on the preset region of interest.

Here, the preset region of interest is the same as the preset region of interest for acquiring the first region image.

In step S102-24, difference value calculation is performed based on the second region image and the second background image to generate a second difference image.

Here, the difference value calculation may be understood as calculating a difference value between the pixel value at each position in the second region image and the pixel value at a corresponding position in the second background image.

In a specific application, performing difference value calculation based on the second region image and the second background image to generate the second difference image includes the following steps.

In step S102-24-1, the second region image is divided into a plurality of second region blocks corresponding to the background region blocks based on positions of the background region blocks.

It may be understood that the size of the second background image is the same as that of the second region image, and each second region block in the second region image has a corresponding background region block at the same position in the second background image.

In step S102-24-2, difference value calculation is performed based on the second region blocks and the corresponding background region blocks respectively to generate the second difference image.

Here, the difference value calculation may be understood as calculating a difference value between the pixel value at each position in the second region block and the pixel value at a corresponding position in the second background image.

In step S102-25, binarization processing is performed based on a preset binarization threshold and the second difference image to generate the third image.

An embodiment of the present disclosure reduces the influence on image analysis of ground reflection after the light supplement by extracting the ROI. At the same time, by dividing the image into the blocks, the calculation complexity is reduced.

Embodiment 4

Since an embodiment of the present disclosure is further optimized based on the above embodiments, the explanations based on the same method and the same names and meanings are the same as those of the above embodiments, and are not repeated here.

The rotation or turning pause includes the following steps.

In the process of rotation or turning, or after periodic walking or pause, the first image before light supplement of the light supplement lamp and the second image when the light supplement lamp is activated for light supplement are collected.

Optionally, the directions for collecting the first image and the second image are the same.

In the process of rotation or turning of the self-walking device, the self-walking device may collide with the obstacle at any time. In order to avoid the collision, in an embodiment of the present disclosure, the self-walking device is paused every time it is rotated by a certain angle or for a certain period of time, so as to determine whether a near-field object exists, thereby further improving the safety of rotation or turning.

Corresponding to the method for detecting a near-field object according to the first aspect of the present disclosure, in the second aspect of the present disclosure, an apparatus for detecting a near-field object is also provided. Since the embodiments in the second aspect are basically similar to the embodiments in the first aspect, the description is relatively simple. For relevant parts, please refer to the corresponding descriptions of the embodiments in the first aspect. The apparatus embodiments described below are merely schematic.

Figure 5:
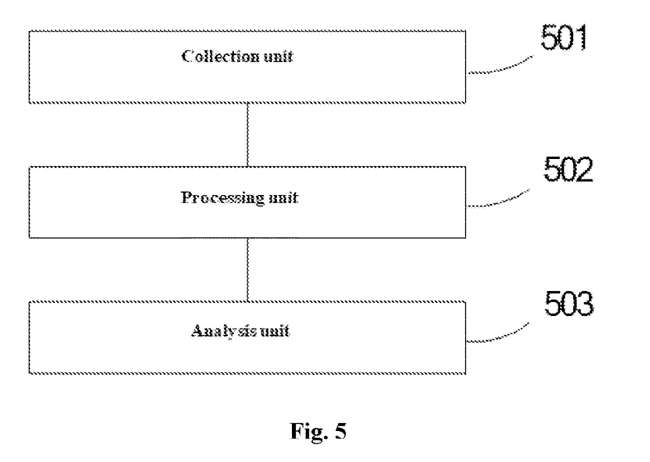
FIG. 5 shows a unit block diagram of an apparatus for detecting a near-field object according to an embodiment of the present disclosure.

FIG. 5 shows an embodiment of an apparatus for detecting a near-field object according to the present disclosure.

As shown in FIG. 5, the present disclosure provides an apparatus for detecting a near-field object, which includes:
a collection unit 501, configured to collect a first image before light supplement of a light supplement lamp and a second image when the light supplement lamp is activated for light supplement;
a processing unit 502, configured to generate, based on the first image and the second image, a third image including a regional bright spot; and
an analysis unit 503, configured to determine, based on a connected domain of the regional bright spot in the third image, whether the near-field object exists.

Optionally, the processing unit 502 is configured to:
perform, based on pixel values in the first image, mean value calculation to generate a first background image;
perform, based on the second image and the first background image, difference value calculation to generate a first difference image; and
perform, based on a preset binarization threshold and the first difference image, binarization processing to generate the third image.

Optionally, the processing unit 502 is configured to:
obtain, based on a preset ROI, a first region image from the first image;
perform, based on pixel values in the first region image, mean value calculation to generate a second background image;
obtain, based on the preset ROI, a second region image from the second image;
perform, based on the second region image and the second background image, difference value calculation to generate a second difference image; and
perform, based on a preset binarization threshold and the second difference image, binarization processing to generate the third image.

Optionally, performing, based on the pixel values in the first region image, mean value calculation to generate the second background image, includes:
dividing, based on a preset block size, the first region image into a plurality of first region blocks; and
respectively calculating a mean value of pixel values in each first region block to generate the second background image, where the second background image includes background region blocks at the same positions as the first region blocks.

Optionally, performing, based on the second region image and the second background image, difference value calculation to generate the second difference image, includes:
dividing, based on positions of the background region blocks, the second region image into a plurality of second region blocks corresponding to the background region blocks; and
performing, based on the second region blocks and the corresponding background region blocks respectively, difference value calculation to generate the second difference image.

Optionally, the analysis unit 503 is configured to:
obtain, based on a preset pixel threshold, a region size value of the connected domain of the regional bright spot in the third image; and
determine, when the region size value is greater than or equal to a preset region size threshold, that the near-field object exists.

Optionally, the collection unit 501 is configured to:
collect the second image when the light supplement lamp is activated for light supplement and a light supplement parameter value is adjusted.

Optionally, the collection unit 501 is further configured to:
after or in a process of rotation or turning, collect the first image before light supplement of the light supplement lamp and the second image when the light supplement lamp is activated for light supplement.

In an embodiment of the present disclosure, the characteristics of the automatic exposure apparatus before and after the light supplement of the light supplement lamp are used. Before and after the light supplement of the light supplement lamp, two images are shot in the same direction, and it is determined whether the near-field object exists by comparing the two images. Without adding additional apparatuses, the task of discovering the near-field object by the self-walking device is completed by using the existing apparatus, and the collision between the self-walking device and the near-field object is avoided.

A third embodiment of the present disclosure provides an electronic device for detecting a near-field object. The electronic device includes at least one processor, and a memory in communication connection with the at least one processor.

The memory stores instructions executable by the at least one processor. When the instructions are executed by the at least one processor, the at least one processor is caused to perform the method for detecting a near-field object according to the first embodiment.

A fourth embodiment of the present disclosure provides a computer storage medium for detecting a near-field object. The computer storage medium stores computer-executable instructions which can implement the method for detecting a near-field object according to the first embodiment.

Figure 6:
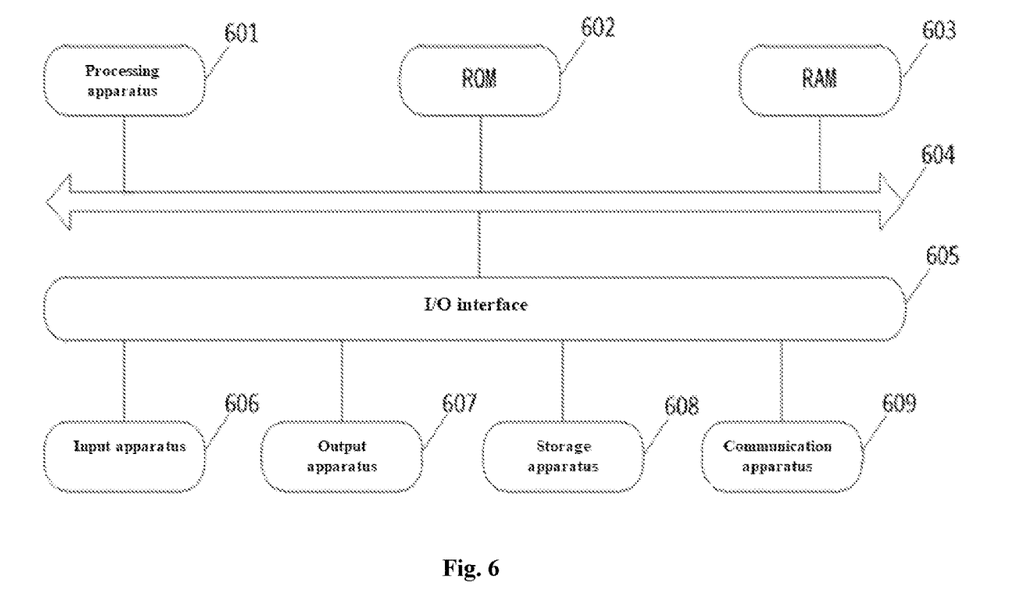
FIG. 6 shows a schematic diagram of a connection structure of an electronic device according to an embodiment of the present disclosure.

Referring to FIG. 6, which shows a schematic structural diagram of an electronic device for implementing an embodiment of the present disclosure. The electronic device in an embodiment of the present disclosure may be a mobile terminal which includes, but is not limited to, a mobile phone, a notebook computer, a digital broadcast receiver, a personal digital assistant (PDA), a tablet computer (also called PAD), a portable multimedia player (PMP), an onboard terminal (such as an onboard navigation terminal) and the like, or may be a fixed terminal such as a digital TV, a desk computer. The electronic device shown in FIG. 6 is only an example, and is not intended to limit the function and application range of embodiments of the present disclosure.

As shown in FIG. 6, the electronic device may include a processing apparatus 601 (e.g., a central processing unit, a graphics processing unit or the like) which can perform various proper actions and processing according to programs stored in a read-only memory (ROM) or programs loaded into a random-access memory (RAM) 603 from a storage apparatus 608. Various programs and data required for operation of the electronic device are also stored in the RAM 603. The processing apparatus 601, the ROM 602 and the RAM 603 are connected with each other by a bus 604. An input/output (I/O) interface 605 is also connected to the bus 604.

Generally, the following apparatuses may be connected to the 110 interface 605: an input apparatus 606 including, for example, a touch screen, a touchpad, a keyboard, a mouse, a camera, a microphone, an accelerometer, a gyroscope and the like; an output apparatus 607 including, for example, a liquid crystal display (LCD), a speaker, a vibrator and the like; a storage apparatus 608 including, for example, a magnetic tape, a hard disk and the like; and a communication apparatus 609. The communication apparatus 609 may allow the electronic device to perform wired or wireless communication with other devices so as to exchange data. FIG. 6 shows the electronic device with various apparatuses, but it should be understood that all shown apparatuses are not required to be implemented or included. More or fewer apparatuses may be alternatively implemented or included.

Particularly, according to embodiments of the present disclosure, the process described above with reference to the flow chart may be implemented as a computer software program. For example, a computer program product is provided according to an embodiment of the present disclosure, which includes a computer program carried on a non-transitory computer-readable medium. The computer program contains a program code for executing the method shown in the flow chart. In such an embodiment, the computer program may be downloaded and installed from the network by the communication apparatus 609, or installed from the storage apparatus 608, or installed from the ROM 602. When the computer program is executed by the processing apparatus 601, the above functions defined in the method provided by embodiments of the present disclosure are executed.

It should be noted that the above computer-readable medium in the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, apparatus, or device, or a combination of any of the above. More specific examples of the computer-readable storage medium may include, but not limited to: an electrical connection with one or more wires, a portable computer disk, a hard disk, a random-access memory (RAM), a read-only memory (ROM), an erasable programmable read-only memory (EPROM or flash memory), optical fiber, a portable compact disk read-only memory (CD-ROM), an optical storage device, a magnetic storage device, or any suitable combination of the above. In the present disclosure, the computer-readable storage medium may be any tangible medium which contains or stores a program, and the program may be used by or in combination with an instruction execution system, apparatus, or device. In the present disclosure, the computer-readable signal medium may include a data signal propagated in a baseband or as part of a carrier wave, and a computer-readable program code is carried therein. This propagated data signal may be in many forms, including but not limited to an electromagnetic signal, an optical signal, or any suitable combination of the above. The computer-readable signal medium may also be any computer-readable medium other than the computer-readable storage medium, and the computer-readable signal medium may send, propagate, or transmit the program for use by or in combination with the instruction execution system, apparatus, or device. The program code contained on the computer-readable medium may be transmitted by any suitable medium, including, but not limited to: a wire, an optical cable, radio frequency (RF), etc., or any suitable combination of the above.

In some embodiments, the client and the server may communicate by using any currently known or future-developed network protocol, for example, an Hyper Text Transfer Protocol (HTTP), and may be interconnected by a digital data communication (such as communication network) of any form or any medium. Examples of the communication network include a local area network (LAN), a wide area network (WAN), an internet network (for example, the Internet), an end-to-end network (for example, an ad hoc end-to-end network), and any currently known or future-developed network.

The above computer-readable medium may be included in the above electronic device, or may exist alone, without being assembled into the electronic device.

The computer program codes for executing the operations of the present disclosure may be written in one or more programming languages or a combination thereof. The above programming languages include, but not limited to, object-oriented programming languages, such as Java, Smalltalk and C++, and also include conventional procedural programming languages, for example, "C" language or similar programming languages. The program codes may be executed entirely on a user computer, partly on the user computer, as an independent software package, partly on the user computer and partly on a remote computer, or entirely on the remote computer or a server. In the case with the remote computer involved, the remote computer may be connected to the user computer through any type of network, including LAN or WAN, or may be connected to an external computer (for example, through the Internet connection by an Internet service provider).

The flowcharts and block diagrams in the accompanying drawings of the present disclosure show the possible architecture, functions, and operations of a system, a method, and a computer program product according to various embodiments of the present disclosure. In this regard, each block in the flowcharts or block diagrams may represent a module, a program segment or a part of codes, and part of the module, the program segment or the codes contains one or more executable instructions for implementing the defined logical functions. It should also be noted that in some alternative implementations, the functions labeled in the blocks may occur in an order different from the order labeled in the accompanying drawings. For example, two sequentially shown blocks may be substantially executed in parallel in fact, and they sometimes may also be executed in a reverse order, depending on related functions. It should also be noted that each block in the block diagrams and/or the flowcharts and the combination of the blocks in the block diagrams and/or the flowcharts may be implemented by a hardware-based dedicated system for executing defined functions or operations, or may be implemented by a combination of the dedicated hardware and computer instructions.

The units described in embodiments of the present disclosure may be implemented in a software form or may be implemented in a hardware form. The names of the units do not constitute any limitation to the units in some cases.

The functions described above herein may be performed, at least in part, by one or more hardware logic components. For example, non-restrictively, exemplary types of hardware logic components that can be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program for use by or in conjunction with an instruction execution system, apparatus or device. The machine-readable medium may be a machine-readable signal medium or a machine-readable storage medium. The machine-readable medium may include, but not limited to, an electronic, magnetic, optical, electromagnetic, infrared or semiconductor system, apparatus or device, or any suitable combination of the foregoing. A more specific example of the machine-readable storage medium includes an electrical connection based on one or more wires, a portable computer disk, a hard disk, a random-access memory (RAM), a read-only memory (ROM), an erasable programmable read-only memory (an EPROM or a flash memory), an optical fiber, a portable compact disk read-only memory (CD-ROM), an optical storage device, a magnetic storage device, or any suitable combination of the above contents.

The foregoing description is only the description of preferred embodiments of the present disclosure and the used technical principle. A person skilled in the art should understand that the scope of the present disclosure is not limited to a technical solution formed by a specific combination of the technical features. In addition, other technical solutions formed by any combination of the foregoing technical features or equivalent features thereof shall be encompassed without departing from the concept of the present disclosure. For example, the technical solutions formed by mutual replacement between the foregoing technical features and the technical features having similar functions (however, the technical features are not limited thereto) disclosed in the present disclosure shall be encompassed.

Furthermore, although a specific order is used to depict the operations, this should not be interpreted that these operations are required to be performed in the specific order shown or in a sequential order of execution. Multitasking and parallel processing may be advantageous in particular environments. In addition, while several specific implementation details are included in the above discussion, these should not be construed as limiting the scope of the present disclosure. Some features described in the context of separate embodiments may also be implemented in combination in a single embodiment. Conversely, various features described in the context of a single embodiment may also be implemented in multiple embodiments individually or in any suitable sub-combination.

Although the present subject matter has been described using language specific to structural features and/or method logical actions, it should be understood that the subject matter defined in the appended claims is not necessarily limited to the particular features or actions described above. Rather, the particular features and actions described above are merely exemplary forms for implementing the claims.

What is claimed is:

1. A method for detecting a near-field object, performed by a self-walking device and comprising:
   collecting a first image before light supplement of a light supplement lamp, and a second image when the light supplement lamp is activated for light supplement;
   generating, based on the first image and the second image, a third image comprising a regional bright spot, wherein the regional bright spot is generated in a case that the light supplement lamp is activated and in an overexposure state;
   obtaining a region size value of a connected domain of the regional bright spot in the third image based on a preset pixel threshold, wherein the connected domain of the regional bright spot is a domain having the same or similar non-zero pixel values; and
   determining, when the region size value is greater than or equal to a preset region size threshold, that the near-field object exists.

2. The method according to claim 1, wherein the generating, based on the first image and the second image, the third image comprising the regional bright spot, comprises:
   generating, based on a mean value of pixel values in the first image, a background image;
   generating, based on the second image and the background image, a first difference image; and
   binarizing, based on a preset binarization threshold, the first difference image to generate the third image.

3. The method according to claim 1, wherein the generating, based on the first image and the second image, the third image comprising the regional bright spot, comprises:
   obtaining a first region image from the first image;
   generating, based on a mean value of pixel values in the first region image, a background image;
   obtaining, from the second image, a second region image corresponding to the first region image;
   generating, based on the second region image and the background image, a second difference image; and
   binarizing, based on a preset binarization threshold, the second difference image to generate the third image.

4. The method according to claim 3, wherein the generating, based on the mean value of the pixel values in the first region image, the background image, comprises:
   dividing the first region image into a plurality of first region blocks; and
   respectively calculating a mean value of pixel values in each first region block to generate the background image, wherein the background image comprises a plurality of background region blocks corresponding to the plurality of first region blocks.

5. The method according to claim 4, wherein the generating, based on the second region image and the background image, the second difference image, comprises:
   dividing, based on the background region blocks, the second region image into a plurality of second region blocks corresponding to the background region blocks; and
   generating, based on the second region blocks and the corresponding background region blocks respectively, the second difference image.

6. The method according to claim 1, wherein the collecting the first image before light supplement of the light supplement lamp, and the second image when the light supplement lamp is activated for light supplement, comprises:
   collecting the second image when the light supplement lamp is activated for light supplement and a light supplement parameter value is adjusted.

7. The method according to claim 1, further comprising:
   after or in a process of rotation or turning of the self-walking device, collecting the first image before light supplement of the light supplement lamp, and the second image when the light supplement lamp is activated for light supplement.

8. An apparatus for detecting a near-field object, comprising:
   a collection unit, configured to collect a first image before light supplement of a light supplement lamp, and a second image when the light supplement lamp is activated for light supplement;
   a processing unit, configured to generate, based on the first image and the second image, a third image comprising a regional bright spot, wherein the regional bright spot is generated in a case that the light supplement lamp is activated and in an overexposure state; and
   an analysis unit, configured to:
   obtain a region size value of a connected domain of the regional bright spot in the third image based on a preset pixel threshold, wherein the connected domain of the regional bright spot is a domain having the same or similar non-zero pixel values; and
   determine, when the region size value is greater than or equal to a preset region size threshold, that the near-field object exists.

9. The apparatus according to claim 8, wherein the processing unit is configured to:
   generate, based on a mean value of pixel values in the first image, a background image;
   generate, based on the second image and the background image, a first difference image; and
   binarize, based on a preset binarization threshold, the first difference image to generate the third image.

10. The apparatus according to claim 8, wherein the processing unit is configured to:
    obtain a first region image from the first image;
    generate, based on a mean value of pixel values in the first region image, a background image;
    obtain, from the second image, a second region image corresponding to the first region image;
    generate, based on the second region image and the background image, a second difference image; and
    binarize, based on a preset binarization threshold, the second difference image to generate the third image.

11. The apparatus according to claim 10, wherein the generating, based on the mean value of the pixel values in the first region image, the background image, comprises:
    dividing the first region image into a plurality of first region blocks; and
    respectively calculating a mean value of pixel values in each first region block to generate the background image, wherein the background image comprises a plurality of background region blocks corresponding to the plurality of first region blocks.

12. The apparatus according to claim 11, wherein the generating, based on the second region image and the background image, the second difference image, comprises:
    dividing, based on the background region blocks, the second region image into a plurality of second region blocks corresponding to the background region blocks; and
    generating, based on the second region blocks and the corresponding background region blocks respectively, the second difference image.

13. The apparatus according to claim 8, wherein the collection unit is configured to:
    collect the second image when the light supplement lamp is activated for light supplement and a light supplement parameter value is adjusted.

14. The apparatus according to claim 8, wherein the collection unit is further configured to:
    after or in a process of rotation or turning of the apparatus, collect the first image before light supplement of the light supplement lamp, and the second image when the light supplement lamp is activated for light supplement.

15. An electronic device comprising:
    one or more processors; and
    a storage apparatus for storing one or more programs, wherein the one or more programs, when executed by the one or more processors, enable the one or more processors to implement a method for detecting a near-field object, comprising:
    collecting a first image before light supplement of a light supplement lamp, and a second image when the light supplement lamp is activated for light supplement;
    generating, based on the first image and the second image, a third image comprising a regional bright spot, wherein the regional bright spot is generated in a case that the light supplement lamp is activated and in an overexposure state;
    obtaining a region size value of a connected domain of the regional bright spot in the third image based on a preset pixel threshold, wherein the connected domain of the regional bright spot is a domain having the same or similar non-zero pixel values; and
    determining, when the region size value is greater than or equal to a preset region size threshold, that the near-field object exists.

16. The electronic device according to claim 15, wherein the generating, based on the first image and the second image, the third image comprising the regional bright spot, comprises:
    generating, based on a mean value of pixel values in the first image, a background image;

generating, based on the second image and the background image, a first difference image; and binarizing, based on a preset binarization threshold, the first difference image to generate the third image.

17. The electronic device according to claim 15, wherein the generating, based on the first image and the second image, the third image comprising the regional bright spot, comprises:

obtaining a first region image from the first image;

generating, based on a mean value of pixel values in the first region image, a background image;

obtaining, from the second image, a second region image corresponding to the first region image;

generating, based on the second region image and the background image, a second difference image; and binarizing, based on a preset binarization threshold, the second difference image to generate the third image.

* * * * *